Patented Dec. 4, 1934

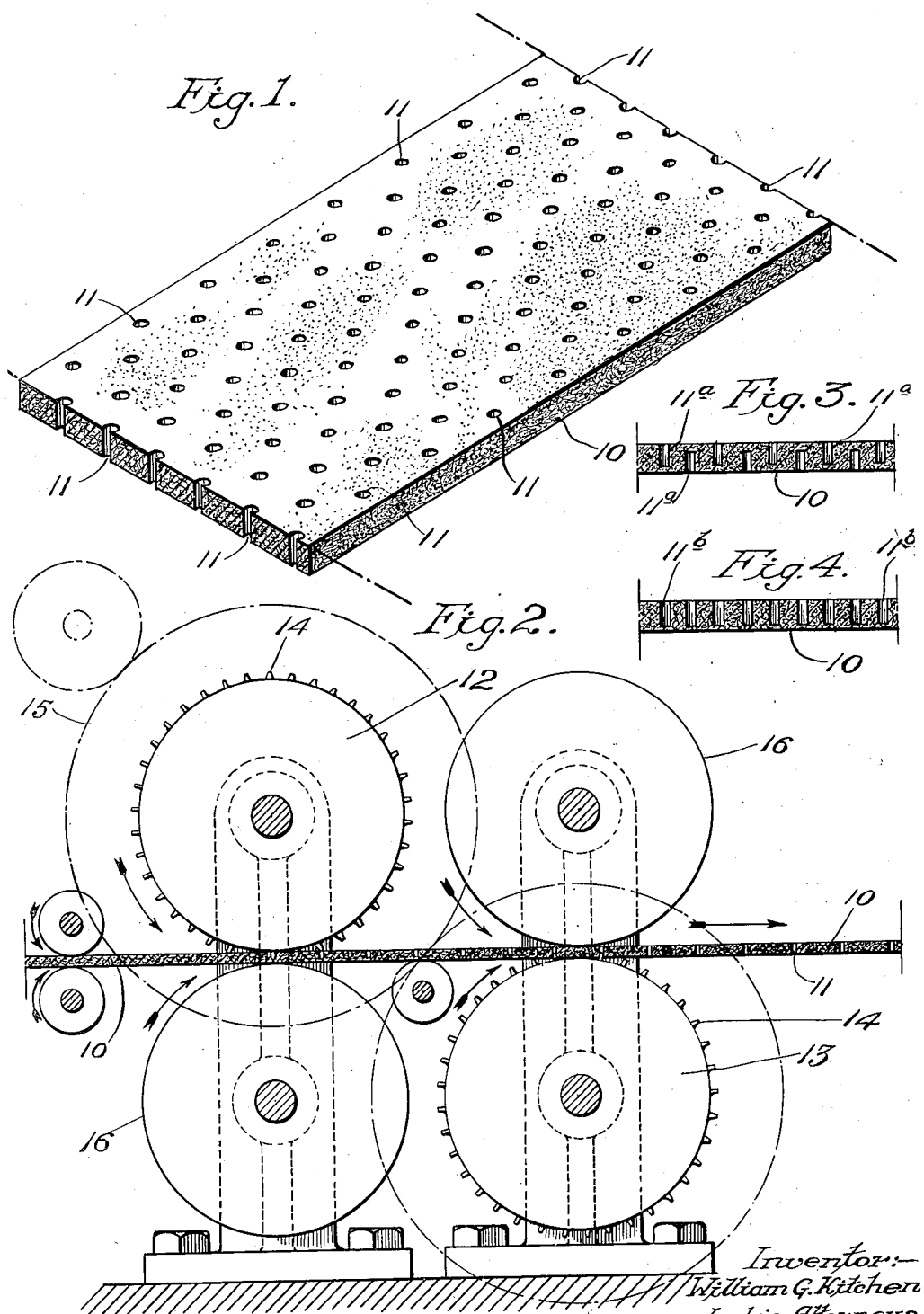

1,983,464

UNITED STATES PATENT OFFICE 1,983,464

METHOD OF MAKING A FLEXIBLE MOLDED BRAKE LINING

William G. Kitchen, Philadelphia, Pa., assignor to Allbestos Corporation, Philadelphia, Pa., a corporation of Pennsylvania Application February 23, 1932, Serial No. 594,644

2 Claims. (Cl. 18—47.5)

This invention relates to brake linings and method of producing the same.

An important object of the invention is the elimination of blistering in brake linings as a result of heating of the lining during application of the brakes. Ordinary brake application produces a temperature in the drum lining of approximately 240 degrees F. minimum. Many brake linings, and particularly those which are more or less striate, when heated to this extent generate gases interiorly thereof as a result of evaporation of contained solvents. These gases collect forming pockets interiorly of the lining, expanding the lining at the particular point where the pocket forms and creating a bulge on the outer surface of the lining. This bulge is, obviously, subjected to intense friction in operation of the brakes and rapidly wears away, with the result that the surface of the lining sloughs and the braking material becomes useless and must be replaced. Accordingly, an important object of the invention is ventilation of the lining in such manner that these gases may escape without forming pockets in the lining.

A further object of the invention is the production of a practical and efficient method of ventilating the lining.

These and other objects I attain by the construction shown in the accompanying drawing wherein, for the purpose of illustration, I have shown a preferred embodiment of my invention and wherein:

Fig. 1 is a perspective of a section of ventilated brake lining constructed in accordance with my invention;

Fig. 2 is a partially diagrammatic side elevation showing apparatus for ventilating the lining;

Fig. 3 is a fragmentary perspective showing a slightly modified method of forming the openings in the lining; and Fig. 4 is a view similar to Fig. 3 showing a further modification.

Referring now more particularly to the drawing, the numeral 10 generally designates a strip of brake lining. This strip may be any of those molded brake linings now in commercial use and usually comprising an asbestos base and a suitable filler, such as talc, fuller's earth and rubber. In addition to these elements, solvents are employed in the construction of such linings and in the molding and curing processes the solvents are not entirely driven off, this being particularly noticeable at the central portion of the lining.

In accordance with my invention, I pierce the lining after formation and vulcanization thereof with a multiplicity of small openings 11, these openings preferably extending entirely through the lining although, as suggested in Figs. 3 and 4, openings may be employed which do not extend entirely through the lining. In the latter case, however, the openings should either extend into the lining from opposite faces thereof and should be of a depth slightly greater than one-half the thickness of the lining as shown so that gas conduction may be had from between all strata in the thickness of the lining as shown at 11—a in Fig. 3 or should extend from one face of the lining to a point closely approximating the other face thereof as at 11—b in Fig. 4.

With such perforation it has been found that brake linings which ordinarily blister at 240 degrees F. may be subjected to much higher temperatures, for example, 600 degrees F., without being affected in any way. This is extremely important in manipulation of the brake linings by the mechanic who often desires that the brake lining shall be re-baked so that it may properly set to the curvature of the brake to which it is being applied. With any of the forms of lining shown in Figs. 1, 3 and 4, gases from the interior of the lining may escape and no blistering will result so that a desired re-baking temperature may be employed in setting the lining. In applying brake lining of the type shown in Fig. 4 the unperforated face of the lining should be placed against the brake element which is stationary to the lining.

While the openings 11, 11—a or 11—b may be formed in the process of producing the lining, such formation has two disadvantages; the necessity for an expensive mold for the lining and the fact that the tendency to vulcanization in the formation of the lining and about the edges of these openings would, to a certain extent, seal the opening walls against the passage of the gases. It is, therefore, preferred that a structure such as shown in Fig. 2 be employed in producing these perforations. In this figure I have illustrated the strip as passed over a pair of rollers 12 and 13, these rollers engaging opposite faces of the lining and having on their periphery pins 14 each of a depth to extend slightly more than half way through the lining. The driving connection may be provided between rollers 12 and 13 so that the location of the openings formed from opposite sides of the lining with relation to one another may be determined, this connection being in the present instance illustrated by the gear wheels 15 shown in dotted lines. In the present disclosure, since the openings of the lining 10 which are formed at opposite sides of the lining are to coincide with one another, each of the rollers 12 and 13 has associated therewith a pressure roller 16. By using an arrangement of this type, long lengths of brake material may be perforated in substantially any desired width so that the apparatus and method described lend themselves to the present practice of vending such linings in rolls containing 25 or 50 feet of the material.

It will be noted that the preferred method of forming the openings is the displacement method in which none of the material is removed from the lining but merely offset therein.

Obviously, with the elimination of gas pocketing by the ventilating of the lining in the manner above described, the life of the lining is much increased and the efficiency of the lining in service likewise increased. It will also be obvious that the openings in addition to the functions above mentioned will serve to assist in cooling the lining in service, thus further extending the life of the lining. Certain changes being possible without in any manner departing from the spirit of my invention, I do not wish to be understood as limiting myself to the specific structure herein set forth except as hereinafter claimed.

I claim:

1. The method of producing non-blistering molded brake lining, comprising molding and vulcanizing the brake lining and thereafter forming ventilating openings therein.

2. The method of producing non-blistering molded brake lining, comprising molding and vulcanizing the brake lining and thereafter punching openings therein.

WILLIAM G. KITCHEN.